(12) United States Patent
Bäck et al.

(10) Patent No.: US 7,136,646 B1
(45) Date of Patent: Nov. 14, 2006

(54) METHOD AND APPARATUS FOR ELECTING AN IDENTIFICATION CONFIRMATION INFORMATION

(75) Inventors: Juha Bäck, Helsinki (FI); Tony Hulkkonen, Vantaa (FI); Teemu Mäkinen, Järvenpää (FI); Hannu-Pekka Salin, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/129,056

(22) PCT Filed: Nov. 3, 1999

(86) PCT No.: PCT/EP99/08422

§ 371 (c)(1),
(2), (4) Date: Jun. 24, 2002

(87) PCT Pub. No.: WO01/33883

PCT Pub. Date: May 10, 2001

(51) Int. Cl.
*H04Q 7/20* (2006.01)

(52) U.S. Cl. .............. 455/435.1; 455/432.2; 455/440

(58) Field of Classification Search .......... 455/435.1, 455/432.1, 432.2, 433, 440, 411
See application file for complete search history.

(56) References Cited

U.S. PATENT DOCUMENTS

| 5,557,654 | A | * | 9/1996 | Maenpaa | 455/411 |
| 5,649,301 | A | * | 7/1997 | Yabusaki et al. | 455/433 |
| 5,862,481 | A | * | 1/1999 | Kulkarni et al. | 455/432.2 |
| 6,081,731 | A | * | 6/2000 | Boltz et al. | 455/565 |
| 6,353,620 | B1 | * | 3/2002 | Sallberg et al. | 370/465 |
| 6,591,116 | B1 | * | 7/2003 | Laurila et al. | 455/558 |
| 6,615,037 | B1 | * | 9/2003 | Bharatia et al. | 455/417 |

FOREIGN PATENT DOCUMENTS

| JP | 06-141366 | 5/1994 |
| JP | 08-009239 | 1/1996 |
| WO | WO 98/59513 | 12/1998 |

OTHER PUBLICATIONS

Mouly, M.; Pautet, M.B.: "The GSM System for Mobile Communications" FR, Lassay-Les-Chateaux, Europe Media, 1993, pp. 432-498, XP000860007.

Nodera Y et al: "Interworking Between GSM and PDC Through IC Cards" Proceedings of the Conference on Communications (ICC), US, New York, IEEE, 1995, pp. 761-765, XP000533114 ISBN: 0-7803-2487-0.

(Continued)

*Primary Examiner*—George Eng
*Assistant Examiner*—Julie E. Stein
(74) *Attorney, Agent, or Firm*—Cohen, Pontani, Lieberman & Pavane (57) ABSTRACT

The present invention relates to a method and an apparatus for performing a location update of a user equipment in a mobile network, wherein it is decided on the basis of the result of a negotiation with an old location register whether to use an identification information obtained from the old location register or to retrieve the identification information from a user database. Accordingly, whenever a fall-back to a protocol version not supporting the required identification information is determined, the identification information is retrieved from the user database, to thereby guarantee that the correct identification information is used in the new location register. The identification information may comprise security or authentication parameters.

47 Claims, 4 Drawing Sheets

OTHER PUBLICATIONS

GSM 03.20 V7.1.0 (Oct. 1999), Digital cellular telecommunications system (Phase 2+); Security related network functions (GSM 03.20 version 7.1.0 Release 1998).

ETSI TS 100 530 V7.0.0 (Aug. 1999), Digital cellular telecommunication system (Phase 2+); Location registration procedures (GSM 03.12 version 7.0.0 Release 1998).

TS 100 526 V7.0.0 (Sep. 1999), Digital cellular telecommunications system (Phase2+); Organization of subscriber data (GSM 03.12 version Release 1998).

Ericsson; "Support of third Algorithm EvaluationTeam", TSG-SA WG3 (Security) meeting #7; The Hague, Oct. 26th-27th, 1999, S3-99371.

Ericsson; "Distribution of authentication vectors between VLRs/SGSNs", TSG-SA WG3 (Security) meeting #7; The Hague, Oct. 26th-27th, 1999, S3-99368.

3G Change Request; TSG-SA WG3; The Hague, Oct. 26th-27th, 1999, S3-99269 S7.

3G Change Request; TSG-SA WG3 #7; The Hague, Oct. 26th-27th, 1999, S3-99370 S7-3;.

3GPP TS 29.002 V3.20.0 (Jun. 2004) 3rd Generation Partnership Project; Technical Specification Group Core Network; Mobile Application Part (MAP) specification (Release 1999).

Office Action dated Sep. 27, 2005 in corresponding Japanese Application No. 2001-534904.

* cited by examiner

METHOD AND APPARATUS FOR ELECTING AN IDENTIFICATION CONFIRMATION INFORMATION

PRIORITY CLAIM

This is a U.S. national stage of application No. PCT/EP99/08422, filed on Nov. 3, 1999. Priority is claimed on that application.

FIELD OF THE INVENTION

The present invention relates to a method and apparatus for selecting an identification confirmation information among at least two sources. The invention may be applied e.g. in a location updating procedure of a user equipment entering a new location area from an old location area of a cellular network such as a UMTS (Universal Mobile Telecommunications System) network, wherein a selection of authentication or security parameters is performed among a visitor location register and a home location register.

BACKGROUND OF THE INVENTION

While a subscriber roams in a mobile network, the mobile terminal updates its location by using a location update procedure. The procedure is initiated when the current location area identifier either broadcast or sent as a dedicated system information by the radio access network changes. In this process, the authentication or security parameters used to enable security, authentication or ciphering procedures e.g. in the air interface are required for the new connection leg as well.

When the location area changes, the serving Visitor Location Register (VLR) may change, too. In such a situation, the new VLR receives an identification confirmation information, such as security or authentication parameters and an International Mobile Subscriber Identity (IMSI) from the previous or old VLR.

Then, the relation between an old Temporary Mobile Subscriber Identity (TMSI), allocated to the mobile terminal, and the IMSI is lost in the old VLR. Moreover, as a part of the location update procedure, the HLR sends the subscriber parameters which need to be known by the new VLR for proper call handling.

In particular, data related to the location of the mobile terminal and to the management of the subscriber is exchanged between the HLR and the VLR. The main service provided to the mobile subscriber is the capability to set up or to receive calls within the whole service area. To support this, the location registers have to exchange data. The HLR sends to the VLR all the data needed to support the service to the mobile subscriber. The HLR then instructs the previous VLR to cancel the location registration of this subscriber. Exchanges of data may occur when the mobile subscriber receives a particular service, when he wants to change some data attached to his subscription or when some parameters of the subscription are modified by administrative means. Accordingly, the HLR is a database in charge of the management of the mobile subscribers.

A mobile network may contain one or several HLRs depending on the number of subscribers, on the capacity of the equipment and on the organisation of the network. Two kinds of information are stored in the HLR: the subscription information and some location information enabling the charging and routing of calls towards the Mobile Switching Centre (MSC) where the mobile terminal is located. Two types of numbers are attached to each mobile subscription and are stored in the HLR: the IMSI and one or more Mobile Station International ISDN numbers (MSISDN). The IMSI or the MSISDN may be used as a key to access the information in the database for a mobile subscription.

The VLR contains a database which includes the IMSI, the MSISDN, a Mobile Station Roaming Number for mobile terminals having an ongoing call, the TMSI if applicable, a Local Mobile Station Identity if used, the location area where the mobile terminal has been registered and which is used to call the station. The above information is passed between the VLR and the HLR by the procedures described in the GSM specification 03.12. The organisation of the subscriber data is outlined in the GSM specification 03.08.

Furthermore, an Authentication Centre (AuC) is associated with the HLR and stores an identity for each mobile subscriber registered with the associated HLR. This key is used to generate data used to authenticate the IMSI and a key used to cipher communication over the radio path between the mobile terminal and the mobile network. The procedures used for authentication and ciphering are described in the GSM specification 03.20.

The development of the third generation UMTS network has led to a release 99 GSM/UMTS system in which a new type of Subscriber Identity Module (SIM) is introduced as the UMTS Subscriber Identity Module (USIM), and new security parameters associated with it. The security function associated with the GSM SIM utilise GSM Authentication Vectors (AVs), i.e. GSM triplets. The new security functions associated with the UMTS USIM utilise UMTS AVs consisting of UMTS quintuplets comprising additional authentication parameters required for the UMTS network.

However, a problem arises, when a USIM mobile terminal roams from a non-UMTS capable GSM MSC/VLR (release 98 MSC/VLR) to a UMTS capable GSM MSC/VLR (release 99 MSC/VLR), for the following reasons.

Initially, the release 98 MSC/VLR contains the subscriber data and the security parameters for the subscriber. Due to a subscriber movement, the following scenario is executed. The UE notices the change of the location area and starts a location update procedure by sending a L3-MM LOCATION UPDATE REQUEST message to the mobile network. The new MSC/VLR identifies that the old location area from where the UE is coming is controlled by another MSC/VLR. It initiates a MAP (Mobile Application Part) version 3 negotiation towards the old MSC/VLR, and a fall-back to MAP version 2 is performed, since the old release 98 MSC/VLR only supports MAP version 2. The new MSC/VLR sends the old location area identifier and the TMSI to the old MSC/VLR in order to retrieve the IMSI and the authentication parameters. In response thereto, the old release 98 MSC/VLR returns the IMSI and the GSM triplets (GSM AVs) of the subscriber. Here, the problem arises, since the new release 99 MSC/VLR does not know whether the subscriber has a USIM in the mobile terminal and whether UMTS AVs should be used.

In the new MAP version 3 operations, a SEND IDENTIFICATION message used between VLRs and a SEND AUTHENTIFICATION INFO message used between the VLR and the HLR are already specified in the release 99 GSM-UMTS to support the transmission of UMTS AVs. However, the way they are used in the specification does not cope with the above problem.

Furthermore, a mechanism for achieving intersystem operability between UMTS and GSM networks has been suggested for allowing secure interoperation between both networks for GSM users (SIM). According to the suggested mechanism, the MSC/VLR is able to derive a UMTS authentication vector from a received GSM authentication vector, by means of standardised conversion functions, in order to provide the UMTS security parameters to the UMTS radio access network. On the mobile side, the UE derives the UMTS authentication parameters from the GSM authentication parameters by means of the standardised conversion functions when the mobile terminal is located in the UMTS radio access network.

However, also in this case, the above problem arises in case a new MSC/VLR does not know the SIM type provided in the mobile terminal.

SUMMARY OF THE INVENTION

It is an object of the present invention to provide a method and apparatus for selecting an identification confirmation information by means of which security can be improved.

This object is achieved by a method for selecting an identification confirmation information used for confirming a user identity, comprising the steps of:

requesting an identification confirmation information from a register;

deciding based on the type of identification confirmation information obtained from the register whether to use the identification confirmation information obtained from the register or an identification confirmation information from a user database; and retrieving the identification confirmation information from the user database in response to the result of the decision step.

Additionally, the above object is achieved by an apparatus for performing a selection of an identification confirmation information used for confirming a user identity, said apparatus comprising:

communicating means for performing a communication with a register;

decision means for deciding on the source of the identification confirmation information of a user equipment based on the type of identification confirmation information received from the register; and retrieving means for retrieving the identification confirmation information either from the register or from a user database based on the decision result of the decision means.

Accordingly, whenever the communication with the register leads to a result that the transmission of a desired identification confirmation information is not supported, e.g. a fall-back to a protocol version not supporting the identification confirmation information or a different type of identification confirmation information is determined, the identification confirmation information is retrieved from the user database to thereby guarantee that the desired identification confirmation information is used.

The type of identification confirmation information may be determined based on a negotiation result, wherein the negotiation may be a MAP version negotiation. In this case the decision means may be arranged to decide on the user database as a source of the identification confirmation information, if the result of the negotiation is a MAP version not supporting the identification confirmation information.

Furthermore, the apparatus and/or the register may be visitor location registers and the user database may be a home location register, wherein the selection is performed during a location updating procedure.

The identification confirmation information may comprise security and/or authentication related data, such as authentication vectors.

Preferably, the identification confirmation information may comprise a parameter indicating a SIM type of the user equipment, wherein the decision step may be based on the parameter. Thus, an extracting means for extracting the SIM type indication information from the identification confirmation information may be provided, wherein the decision means is arranged to decide on the basis of the SIM type indication information. In this case, a UMTS authentication vector may be used for authentication, if said SIM type parameter indicates that a USIM is provided in the user equipment. In particular, the SIM type parameter may be included in a MAP SEND IDENTIFICATION response message received from the old location register. Furthermore, the SIM type parameter may be included in a MAP SEND AUTHENTIFICATION INFO response message received from the user database. The SIM type parameter may be set to an indefinite value, if a required MAP version negotiation is not supported towards the user database.

Thereby, the location register or the user database are able to explicitly indicate to the apparatus the type of identification confirmation information associated with the user equipment which may be identified by the IMSI. Hence, even in case vendors implement only a subset of capabilities, a SIM type indication may be achieved, wherein the SIM type may be at least indicated as being unknown, such that the new location register may request the corresponding identification confirmation information from the user database.

Alternatively, a classmark information of a user equipment may be used in the decision step so as to indicate the SIM type of the user equipment.

The decision means may be arranged to set the SIM type indication information based on an identification confirmation information received from the user database, if the extracted SIM type indication information is indefinite, or to set the SIM type indication information to an indefinite value, if a required MAP version is not supported towards the user database.

BRIEF DESCRIPTION OF THE DRAWINGS

In the following, the present invention will be described in greater detail on the basis of a preferred embodiment with reference to the accompanying drawings in which.

DESCRIPTION OF THE PREFERRED EMBODIMENT

The preferred embodiment will now be described on the basis of a USIM roaming in location areas of a mobile network comprising different kinds of visitor location registers with different capabilities, i.e. release versions.

Figure 1:
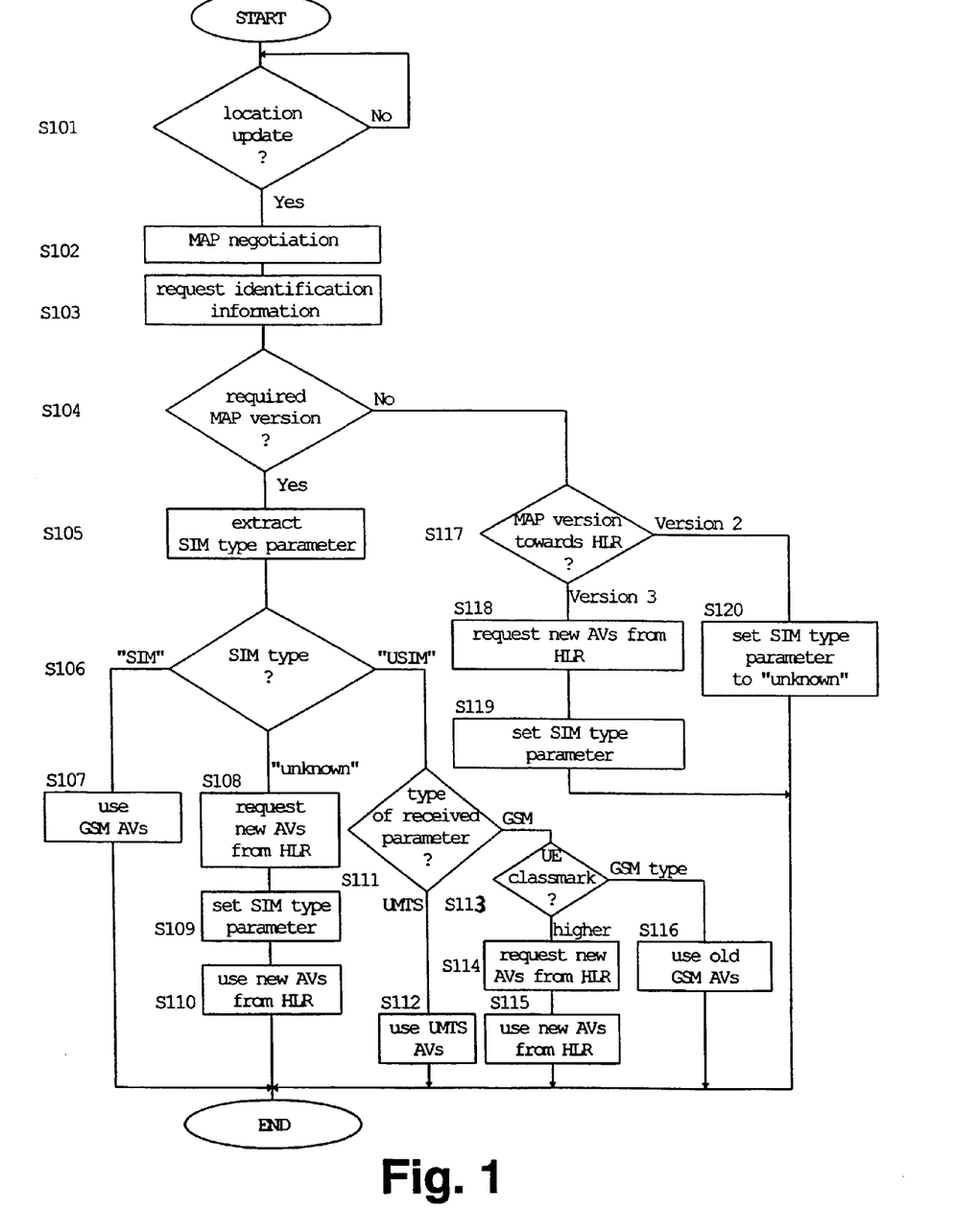
FIG. 1 shows a flow diagram of a location update procedure according to the preferred embodiment of the present invention.

Initially, the location update procedure according to the preferred embodiment of the present invention is described with reference to FIG. 1 which shows a corresponding flow diagram. The described location update procedure may be performed in a visitor location register, a Serving GPRS Support Node (SGSN) of a General Packet Radio Services (GPRS) network, or any other register used by a network switching element to retrieve information for handling calls to or from a roaming user equipment currently located in its area.

The procedure starts when a location update request has been received in step S101 from a user equipment roaming in the respective location area. If a location update request has been received, a version negotiation, e.g. a MAP version negotiation, is performed with the old VLR indicated in the location update request message (step S102). Then, a request for an identification confirmation information, e.g. security and/or authentication parameters, is issued to the old VLR (step S103).

Thereafter, the MAP version used for the communication is checked in step S104. If a required MAP version, e.g. MAP version 3 which is required for transmitting the complete identification confirmation information, is supported by the old VLR, a SIM type indication parameter is extracted from the received identification confirmation information (step S105). Then, the SIM type indicated by the SIM type indication parameter is checked in step S106. If a GSM SIM is indicated, the procedure branches to step S107 where receiver GSM authentication vectors are used by the new VLR for the authentication. If the SIM type determined in step S106 indicates a UMTS USIM, the procedure branches to step S111 where the type of the received identification confirmation information (e.g. security or authentication parameters) is checked. If the received parameters are of a UMTS type (e.g. UMTS quintuplets), the received UMTS authentication vectors or parameters are used in the new VLR for authentication (S112). Otherwise, if the received parameters are of a GSM type (e.g. GSM triplets), a classmark information of the user equipment is checked in step S113. If the classmark indicates that the user equipment is of a GSM type, the received GSM parameters are used (S116). Otherwise, if the classmark indicates that the user equipment is of a higher type, then a request for a new authentication information (authentication vectors) is issued to the HLR (S114). Then, the new authentication vectors received from the HLR are used for authentication (S115). Thereby, a case is covered where new authentication vectors are to be retrieved from the HLR although "USIM" is indicated by the SIM type indication parameter. As an example for such a case, the old VLR may itself have received a SIM type indication parameter set to "USIM", may have used up all of the received UMTS authentication vectors, and may only have been able to received new GSM authentication vectors, since it only supports MAP version 2 towards the HLR. Then, the new VLR again requests new authentication vectors from the HLR.

In case the SIM type indication parameter is set to a indefinite value, e.g., "unknown", the procedure branches to step S108 where a request for a new authentication information is issued to the HLR. Then, a SIM type indication parameter used in the new VLR is set in accordance with the new identification confirmation information (authentication vectors) received from the HLR (step S109). Then, the authentication vectors received from the HLR are used in step S110 for the authentication of the user equipment entering the new location area.

In case it is determined in step S104 that the required MAP version 3 is not supported by the old VLR, the procedure branches to step S117 where the MAP version supported by the new VLR towards the HLR is checked. If a MAP version insufficient for transmitting the entire identification confirmation information (e.g. UMTS AVs) is supported, i.e. MAP version 2, the procedure branches to step S120 where the SIM type indication parameter used in the new VLR is set to an indefinite value ("unknown"). On the other hand, if MAP version 3 is supported towards the HLR, the procedure branches to step S118 where a new identification confirmation information (authentication vector) is requested from the HLR. Then, the SIM type indication parameter is set in step S119 according to the received type of identification confirmation information (authentication vector).

Hence, according to the preferred embodiment of the present invention, whenever a fall-back to an insufficient MAP version between VLRs is made, a release 99 MSC/VLR retrieves the security or authentication vectors from the HLR/AuC to guarantee that the correct authentication parameters are used.

However, vendors usually do not strictly implement release 98 and release 99 VLRs, i.e. a particular VLR may implement only a subset of release 99 MAP operations. Thus, a situation may arise that some VLRs implement MAP version 3 of the MAP SEND IDENTIFICATION message but only MAP version 2 of MAP SEND AUTHENTICATION INFO message. Therefore, the SIM type indication parameter is provided and can be set to three different values, i.e., "SIM", "USIM", or "unknown". The new SIM type indication parameter may be incorporated into the version 3 of the MAP SEND IDENTIFICATION response message and optionally also into the MAP SEND AUTHENTICATION INFO response message. Thereby, the VLR and optionally the HLR may indicate to the new VLR the type of SIM associated with the given IMSI of the user equipment entering the new location area.

Alternatively, the new VLR may set this parameter based on the type of the received security or authentication parameters or subscriber data from the HLR without receiving an explicit indication from the HLR. Thereby, it is assured that the correct identification confirmation information is used for the user equipment in the new VLR.

In the following, an example scenario illustrating a USIM roaming in different kinds of VLRs is described on the basis of the block diagram shown in FIG. 2 and a corresponding message flow diagram shown in FIG. 3.

Figure 2:
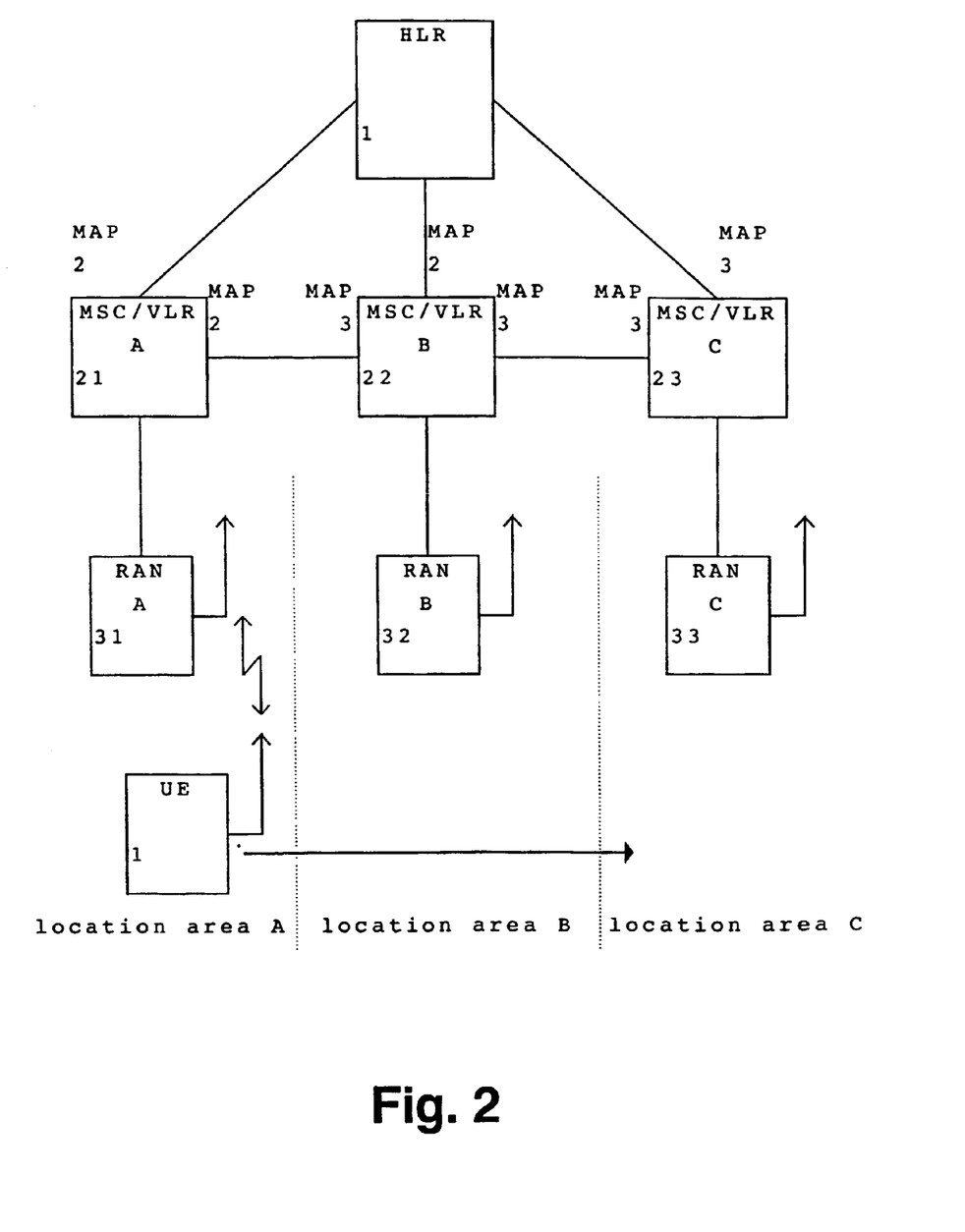
FIG. 2 shows a principal block diagram of a mobile-network comprising visitor location registers with different location update capabilities.
Figure 3:
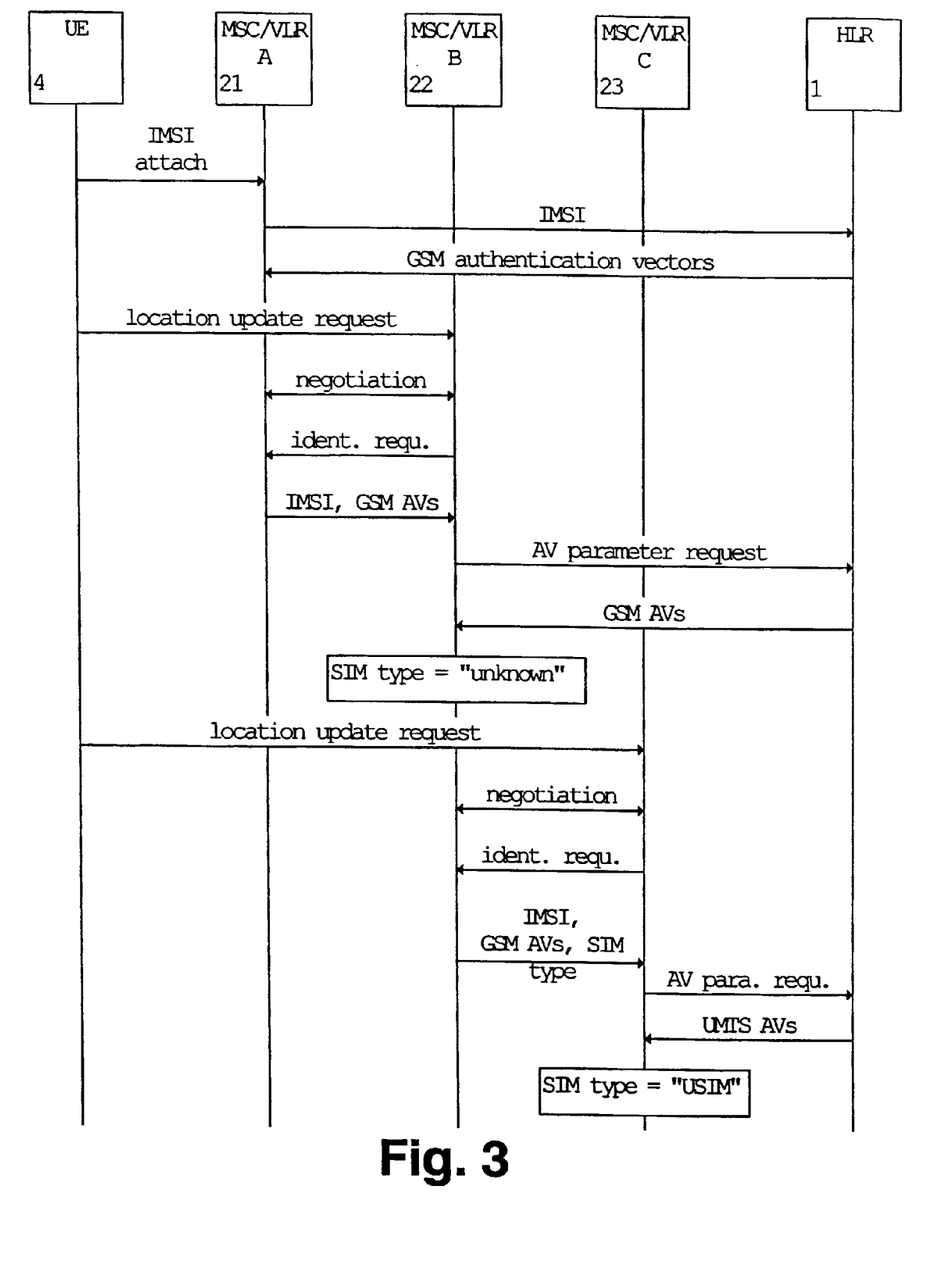
FIG. 3 shows a message transmission diagram relating to location update procedures in the mobile network according to FIG. 2.

According to FIG. 2, a mobile network comprises a HLR (or HLR/AuC) 1 connected to respective MSC/VLRs A, B and C 21 to 23, wherein the VLRs are location and management databases for mobile subscribers (Ues) roaming in the area controlled by the associated MSCs. Whenever the MSC needs data related to a given UE 4 currently located in its area, it interrogates the corresponding VLR. When the UE 4 initiates a location updating procedure with one of the MSC/VLRs A, B and C 21 to 23, the corresponding MSC informs its VLR which stores the relevant information. This procedure occurs whenever the UE 4 roams to another one of the location areas A, B and C served by a respective one of the MSC/VLRs A, B and C 21 to 23. The communication between the UE 4 and the MSC/VLRs A, B and C 21 to 23 is performed via respective Radio Access Networks (RAN) A, B and C 31 to 33 which are radio-connected to the UE 4 in the respective one of the location areas A, B and C. The RANs A, B and C 31 to 33 may comprise a Base Station Subsystem, a UMTS Radio Access Network, or the like.

As shown in FIG. 2, the MSC/VLR A 21 supports MAP version 2 towards the HLR 1 and towards the MSC/VLR B 22. Furthermore, the MSC/VLR B 22 supports MAP version 2 towards the HLR 1 and MAP version 3 towards the MSC/VLR A 21. Finally, the MSC VLR C 23 supports MAP version 3 towards the HLR 1 and also towards the MSC/VLR B 22. Thus, the MSC/VLR A 21 is a non-UMTS capable MSC/VLR (release 98 GSM MSC/VLR), the MSC/VLR B 22 is a hybrid MSC/VLR, and the MSC/VLR C 23 is a UMTS capable MSC/VLR (release 99 MSC/VLR).

In the following, a case where the UE 4 roams from the location area A to the location area B, and subsequently to the location area C, is described with reference to FIG. 3.

Assuming that the UE 4 is activated in the location area A, an IMSI attach procedure is performed by the UE 4 towards the MSC/VLR A 21 upon activation thereof. In response thereto, the MSC/VLR A 21 transmits the IMSI of the UE 4 to the HLR and receives GSM authentication vectors (triplets) from the HLR 1. It is noted that only GSM authentication vectors are transmitted to the MSC/VLR A 21, since the MSC/VLR A 21 is a release 98 MSC/VLR.

When the UE 4 leaves the location area A and enters the location area B, it issues a location update request including a respective TMSI to the hybrid MSC/VLR B 22. In response thereto, the MSC/VLR B 22 performs a MAP version negotiation with the MSC/VLR A 21, which leads to the establishment of MAP version 2. Then, the MSC/VLR B 22 requests the identification confirmation information from the MSC/VLR A 21 and receives the GSM authentication vectors and the IMSI of the UE 4. Since the MAP version negotiation led to MAP version 2, the MSC/VLR B 22 requests new security or authentication parameters from the HLR 1. However, in the present case, this is an optional measure, since the MSC/VLR B 22 may decide not to request the parameters from the HLR 1 if the application initiating the request knows that only MAP version 2 is supported towards the HLR 1.

In response to the parameter request, the HLR 1 transmits GSM authentication vectors to the MSC/VLR B 22. The previous MSC/VLR B 22 used a MAP version 2 towards the MSC VLR A 21 and towards the HLR 1. Hence, it sets the SIM indication parameter to "unknown", since it does not know the SIM type provided at the UE 4.

When the UE 4 leaves the location area B and enters the location area C, it transmits a location update request comprising the TMSI of the old MSC/VLR B 22 to the new MSC/VLR C 23. Then, the MSC/VLR C 23 starts a MAP version negotiation towards the MSC/VLR B 22, which leads to the establishment of MAP version 3, and asks the subscribers IMSI and security authentication parameters from the MSC/VLR B 22. In response thereto, the IMSI and security authentication parameters are transmitted together with the SIM type indication parameter to the new MSC/VLR C 23. Since the MSC/VLR C 23 notices on the basis of the SIM type indication parameter that the SIM type of the UE 4 is not known or indefinite, it retrieves the required UMTS authentication vectors by a corresponding request issued to the HLR 1. Having received the UMTS authentication vectors from the HLR 1, the MSC/VLR C 23 sets the SIM type indication parameter associated with the subscriber of the UE4 to "USIM". Thus, the correct authentication vector is used in the UMTS MSC/VLR C 23.

Figure 4:
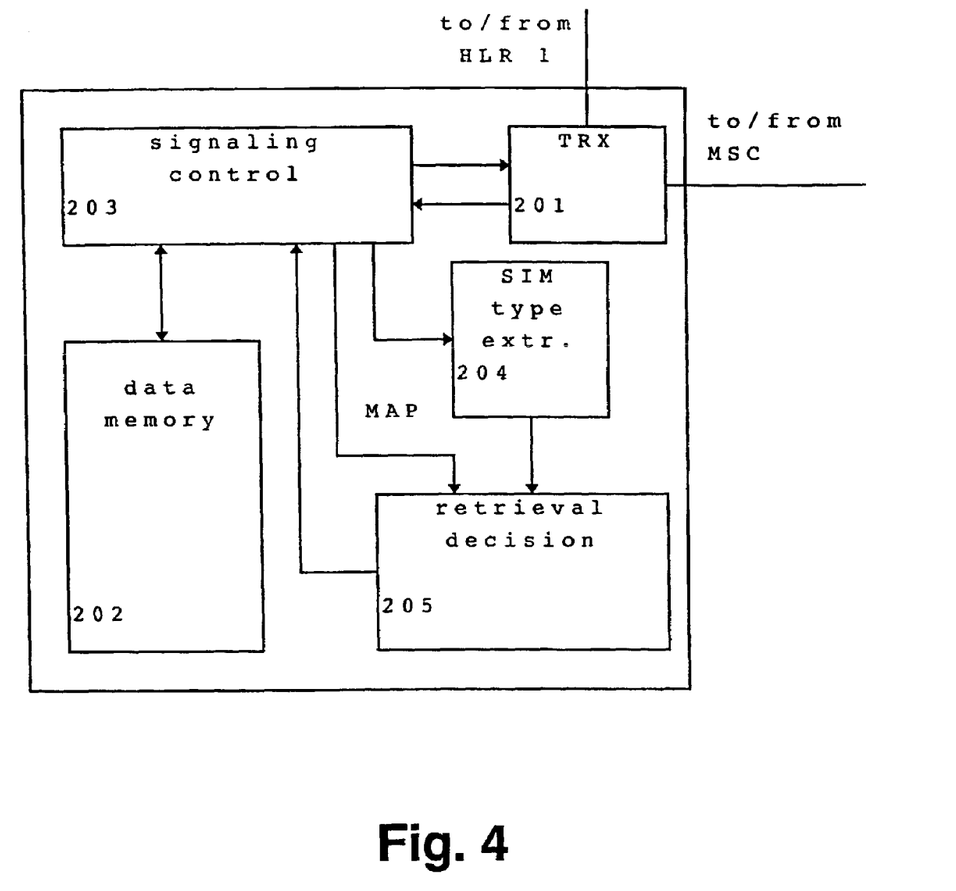
FIG. 4 shows a basic block diagram of an apparatus for performing a location update according to the preferred embodiment of the present invention.

FIG. 4 shows a basic block diagram of an apparatus for performing the above described location update procedure, e.g. a VLR unit, a GSGN or the like. According to FIG. 4, a transceiver unit (TRX) 201 is provided for transmitting/receiving information and messages to/from the HLR 1 or the respective MSC to which the apparatus is allocated. Furthermore, a signaling control unit 203 is provided which controls the signaling performed with the HLR 1 or the allocated MSC in order to provide the required data exchange with a subscriber data memory 202 in which the subscriber information for e.g. handling of calls to or from roaming mobile stations currently located in its area is stored. Furthermore, the signaling control units 203 is arranged to perform the respective version negotiation (e.g. MAP version negotiation) with corresponding other apparatuses via the allocated MSCS.

According to the preferred embodiment, a SIM type extractor 204 is provided for extracting a SIM type parameter from the identification confirmation information supplied from the signaling control unit 203 in the course of a location update procedure. Moreover, a retrieval decision unit 205 is provided to which an information indicating the established MAP version is supplied from the signaling control unit 203 and to which the SIM type parameter extracted by the SIM type extractor 204 is supplied. Based on the MAP version and the SIM type parameter, the retrieval decision unit 105 controls the signalling control unit 203 so as to request a new identification confirmation information (security or authentication parameters) from the HLR 1, as described on the basis of the flow diagram shown in FIG. 1.

The selection of the indentification confirmation information not necessarily has to be based on the result of the negotiation performed with the location register. The type of the received indentification confirmation information may as well be determined on the basis of the format or structure of the information, e.g. triplets, quintuples or other kinds of vectors. Moreover, the classmark information may be directly used to identify the kind or version of the user equipment required for deciding on the selection of the user database as a source of the indentification confirmation information.

It is to be noted that the basic block diagrams shown in FIGS. 2 and 4 only comprise those components essential for performing the functions required for the present invention. Any other components of the shown network entities have been omitted for reasons of simplicity. Furthermore, it is noted that the functions of the respective blocks shown in FIG. 4 may be achieved by corresponding sub-routines of a control program controlling a processing unit (e.g. CPU), arranged in the respective apparatus.

The invention may be applied to any kind of security related information to be retrieved. It could be used for a selection of ciphering parameters used for encrypting or decrypting messages, e.g. in a PGP public key encryption method, wherein the register could be a database storing receiver or transmitter related data.

Moreover, it is pointed out that the present invention is not limited to the provision of authentication parameters in a GSM/UMTS network. It can be applied to any telecommunication network where an identification confirmation information is used in respective network entities having different release versions or capabilities, so as to guarantee the use of a desired identification confirmation information. Thus, the above description of the preferred embodiment and the accompanying drawings are only to intended to illustrate the present invention. The preferred embodiment of the present invention may vary within the scope of the attached claims.

What is claimed is:

1. A method for selecting, by a network element, an identification confirmation information used for confirming a user identity, comprising the steps of:
   a) requesting, by the network element, an identification confirmation information from a register;
   b) receiving, by the network element, the identification confirmation information from the register;
   c) deciding, by the network element, based on a type of identification confirmation information obtained from said register whether to use said identification confirmation information obtained from said register or identification confirmation information from a user database; and
   d) retrieving, by the network element, said identification confirmation information from said user database if the network element decides to use the identification confirmation information from the user database;
   wherein said type of identification confirmation information is determined based on a negotiation result of a MAP version negotiation, said identification confirmation information being retrieved from said user database if said negotiation leads to a result that use of the MAP version required by the network element is not supported by the register.

2. The method of claim 1, wherein said identification confirmation information comprises at least one of security or authentication related data.

3. The method of claim 2, wherein said register is a visitor location register and said user database is a home location register, and wherein said selection is performed during a location updating procedure.

4. The method of claim 2, wherein the type of identification confirmation information is determined based on a negotiation result.

5. The method of claim 2, wherein a parameter indicating a SIM type user equipment is added to said identification confirmation information, and said decision step is performed based on said parameter.

6. The method of claim 1, wherein said register is a visitor location register and said user database is a home location register, and wherein said selection is performed during a location updating procedure.

7. The method of claim 6, wherein the type of identification confirmation information is determined based on a negotiation result.

8. The method of claim 6, wherein a parameter indicating a SIM type user equipment is added to said identification confirmation information, and said decision step is performed based on said parameter.

9. The method of claim 1, wherein said identification confirmation information is a ciphering information used in a public key encryption.

10. The method of claim 4, wherein a parameter indicating a SIM type user equipment is added to said identification confirmation information, and said decision step is performed based on said parameter.

11. The method of claim 1, wherein a parameter indicating a SIM type of user equipment is added to said identification confirmation information, and said decision step is performed based on said parameter.

12. The method of claim 11, wherein a UMTS authentication vector is used for authentication if said SIM type parameter indicates that a USIM is provided in said user equipment.

13. The method of claim 12, wherein said SIM type parameter is included in a MAP SENT IDENTIFICATION response message received from said register.

14. The method according to claim 12, wherein said SIM type parameter is included in a MAP SEND AUTHENTICATION INFO response message received from said user database.

15. The method according to claim 12, wherein said SIM type parameter is set to an indefinite value if a required MAP version is not supported by said register and said user database.

16. The method of claim 11, wherein said SIM type parameter is included in a MAP SENT IDENTIFICATION response message received from said register.

17. The method of claim 16, wherein said SIM type parameter is included in a MAP SEND AUTHENTICATION INFO response message received from said user database.

18. The method of claim 16, wherein said SIM type parameter is set to an indefinite value if a required MAP version is not supported by said register and said user database.

19. The method of claim 11, wherein said SIM type parameter is included in a MAP SEND AUTHENTICATION INFO response message received from said user database.

20. The method of claim 19, wherein said SIM type parameter is set to an indefinite value if a required MAP version is not supported by said register and said user database.

21. The method of claim 11, wherein said SIM type parameter is set to an indefinite value if a required MAP version is not supported by said register and said user database.

22. An apparatus for performing a selection of identification confirmation information used for confirming a user identity, said apparatus comprising:
   a) communicating means for performing a communication with a register;
   b) decision means for deciding on a source of said identification confirmation information of a user equipment based on a type of identification confirmation information received from said register; and
   c) retrieving means for retrieving said identification confirmation information from a user database if the decision means decides to use the identification confirmation information from the user database;
   wherein said type of identification confirmation information is determined based on a MAP version negotiation with said register, said decision means being arranged to determine whether said user database is the source of said identification confirmation information if said negotiation leads to a result that the MAP version required by the network element is not supported by the register.

23. The apparatus of claim 22, wherein said apparatus is a visitor location register.

24. The apparatus of claim 23, wherein said register is a visitor location register, and said user database is a home location register.

25. The apparatus of claim 23, wherein said type of identification confirmation information is determined based on a negotiation with said register.

26. The apparatus of claim 23, further comprising:
   extracting means for extracting SIM type indication information from said identification confirmation information, wherein said decision means is arranged to determine the source of said identification confirmation information based on said SIM type indication information.

27. The apparatus of claim 22, wherein said register is a visitor location register, and said user database is a home location register.

28. The apparatus of claim 27, wherein said type of identification confirmation information is determined based on a negotiation with said register.

29. The apparatus of claim 27, further comprising:
extracting means for extracting SIM type indication information from said identification confirmation information,
wherein said decision means is arranged to determine the source of said identification confirmation information based on said SIM type indication information.

30. The apparatus of claim 22, further comprising:
extracting means for extracting SIM type indication information from said identification confirmation information;
wherein said decision means is arranged to determine the source of said identification confirmation information based on said SIM type indication information.

31. The apparatus of claim 30, wherein said decision means is arranged to set said SIM type indication information to an indefinite value if a required MAP version is not supported by said register and said user database.

32. The apparatus of claim 31, wherein said decision means is arranged to set said SIM type indication information according to the identification confirmation information retrieved from said user database if said extracted SIM type indication information is indefinite.

33. The apparatus of claim 30, wherein said decision means is arranged to set said SIM type indication information according to the identification confirmation information retrieved from said user database if said extracted SIM type indication information is indefinite.

34. A signaling control unit for communicating with a register, comprising:
means for generating a SIM type parameter for indicating a type of SIM type user equipment, said parameter being provided to an extracting means which extracts said SIM type parameter from identification confirmation information obtained from the register; and
means for providing information with respect to the parameter to the extracting means to determine whether to use identification confirmation information obtained from said register or identification confirmation information obtained from a user database;
wherein a type of identification confirmation information is determined based on a negotiation result of a MAP version negotiation said identification confirmation information is retrieved from said user database if said negotiation leads to a result that use of the MAP version required by the network element is not supported by the register.

35. The control unit of claim 34, wherein the parameter indicating the SIM type of user equipment is added to said identification confirmation information.

36. The control unit of claim 35, wherein a UMTS authentication vector is used for authentication if said SIM type parameter indicates that a USIM is provided in said user equipment.

37. The control unit of claim 35, wherein said SIM type parameter is included in a MAP SENT IDENTIFICATION response message received from said register.

38. The control unit of claim 35, wherein said SIM type parameter is included in a MAP SEND AUTHENTICATION INFO response message received from said user database.

39. The control unit of claim 35, wherein said SIM type parameter is set to an indefinite value if a required MAP version is not supported by said register and said user database.

40. The control unit of claim 34, wherein the control unit controls signaling which is performed with a home location register or an allocated MSC so to provide a required data exchange with a subscriber data memory.

41. A retrieval decision unit for controlling a signaling control unit so as to request new identification confirmation information, comprising:
means for receiving a SIM type parameter generated by the signaling control unit; and
means for controlling the signaling control unit so as to request transmittal of the new identification confirmation information from a user database if a decision is made in a network to use identification confirmation information from a user database;
wherein a type of identification confirmation information is determined based on a negotiation result of a MAP version negotiation said identification confirmation information being retrieved from said user database if said negotiation leads to a result that use of a MAP version required by a network element is not supported by the register.

42. The retrieval decision unit of claim 41, wherein the new identification confirmation information comprises security or authentication parameters.

43. A computer readable medium encoded with a computer program for use on a system for performing a selection of identification confirmation information, the computer program comprising the computer readable medium having computer readable program code thereon, the computer readable program code including:
program code for requesting by the network element, an identification confirmation information from a register;
program code for receiving, by the network element, the identification confirmation information from the register;
program code for deciding, by the network element, based on a type of identification confirmation information obtained from said register whether to use said identification confirmation information obtained from said register or identification confirmation information from a user database; and
program code for retrieving, by the network element, said identification confirmation information from said user database if the network element decides to use the identification confirmation information from the user database;
wherein said type of identification confirmation information is determined based on a negotiation result of a MAP version negotiation, said identification confirmation information is retrieved from said user database if said negotiation leads to a result that use of the MAP version required by the network element is not supported by the register.

44. A method for selecting, by a network element, an identification confirmation information used for confirming a user identity, comprising the steps of:
a) requesting, by the network element, an identification confirmation information from a register;

b) receiving, by the network element, the identification confirmation information from the register;
c) deciding, by the network element, based on a type of identification confirmation information obtained from said register whether to use said identification confirmation information obtained from said register or identification confirmation information from a user database; and
d) retrieving, by the network element, said identification confirmation information from said user database if the network element decides to use the identification confirmation information from the user database;
    wherein a parameter indicating a SIM type of user equipment is added to said identification confirmation information, and said decision step is performed based on said parameter; a SIM type parameter being set to an indefinite value if a required MAP version is not supported by said register and said user database.

45. The method of claim 44, wherein a UMTS authentication vector is used for authentication if said SIM type parameter indicates that a USIM is provided in said user equipment.

46. The method of claim 44, wherein said SIM type parameter is included in a MAP SENT IDENTIFICATION response message received from said register.

47. The method of claim 44, wherein said SIM type parameter is included in a MAP SEND AUTHENTICATION INFO response message received from said user database.

* * * * *